United States Patent
Sihavong et al.

(10) Patent No.: US 11,741,531 B2
(45) Date of Patent: Aug. 29, 2023

(54) BEHAVIORAL SAVINGS SYSTEMS AND METHODS FOR IMPLEMENTING REAL-TIME OPTIMIZED SAVINGS

(71) Applicant: INTUIT INC., Mountain View, CA (US)

(72) Inventors: Phouphet Sihavong, Mountain View, CA (US); Joven Matias, San Diego, CA (US); Joanne Locascio, Mountain View, CA (US)

(73) Assignee: INTUIT Inc., Mountain View, CA (US)

( * ) Notice: Subject to any disclaimer, the term of this patent is extended or adjusted under 35 U.S.C. 154(b) by 254 days.

(21) Appl. No.: 17/188,187

(22) Filed: Mar. 1, 2021

(65) Prior Publication Data

US 2022/0277383 A1 Sep. 1, 2022

(51) Int. Cl.
*G06Q 30/00* (2023.01)
*G06Q 30/0601* (2023.01)
*G06Q 40/12* (2023.01)

(52) U.S. Cl.
CPC ......... *G06Q 30/0641* (2013.01); *G06Q 40/12* (2013.12)

(58) Field of Classification Search
CPC ................. G06Q 30/0641; G06Q 40/12
See application file for complete search history.

(56) References Cited

U.S. PATENT DOCUMENTS

| | | | | |
|---|---|---|---|---|
| 8,538,827 B1* | 9/2013 | Dryer | ............ | G06Q 30/00 705/26.1 |
| 8,606,708 B1* | 12/2013 | Homier | ............ | G06Q 40/02 705/40 |
| 10,825,073 B1* | 11/2020 | Walters | ............ | G06N 7/005 |
| 11,227,301 B1* | 1/2022 | Dalton | ............ | H04W 4/80 |
| 2014/0095285 A1* | 4/2014 | Wadell | ............ | G06Q 30/00 705/26.7 |
| 2016/0307161 A1* | 10/2016 | Hentschel | ............ | G06Q 10/1057 |
| 2017/0032435 A1* | 2/2017 | Torres | ............ | G06Q 30/0629 |
| 2017/0208021 A1* | 7/2017 | Ingram | ............ | H04L 67/535 |
| 2019/0026836 A1* | 1/2019 | Milkovich | ............ | G09B 19/18 |
| 2020/0394700 A1* | 12/2020 | Koch | ............ | G06Q 30/0641 |
| 2021/0027357 A1* | 1/2021 | Bonfigli | ............ | G06Q 30/0621 |
| 2021/0390875 A1* | 12/2021 | Ranganathan | ............ | G06Q 40/06 |

OTHER PUBLICATIONS

Wendel, Steve. "Behavioral Nudges and Consumer Technology." Nudge Theory in Action. Palgrave Macmillan, Cham, 2016. 95-123.*

* cited by examiner

*Primary Examiner* — Kathleen Palavecino
(74) *Attorney, Agent, or Firm* — DLA Piper LLP (US)

(57) ABSTRACT

A computer-implemented system and method for generating and implementing real-time optimized savings recommendations during online purchase checkout processes. The recommendations may be in the form of personalized digital nudges designed to influence the user in a manner that furthers a savings goal.

20 Claims, 9 Drawing Sheets

BEHAVIORAL SAVINGS SYSTEMS AND METHODS FOR IMPLEMENTING REAL-TIME OPTIMIZED SAVINGS

BACKGROUND

Currently, large debt and poor saving habits are at epidemic levels across the United States. It is estimated that 45% of Americans live paycheck to paycheck. Significantly, it is estimated that 40% of Americans could not come up with $400 if needed for an emergency situation. A large number of these people do not have enough savings due to their habitual overspending on nonessentials. Purchasers may overspend without considering their financial status or an intent to use their money mindfully and responsibly during checkout and payment transaction processes. This may directly affect the purchasers' savings. Existing financial and accounting systems may analyze historical transitions, but this will only reveal purchase behavior after the purchases have been made and do not provide real-time purchase suggestions based on the purchaser's financial status during purchase or checkout processes. Accordingly, there is a desire and need for a system and or method that can provide real-time purchase suggestions that are made in view of the purchaser's financial status and that are present during a purchase or checkout process (i.e., before the purchase is completed).

BRIEF DESCRIPTION OF THE FIGURES

The foregoing and other aspects of embodiments are described in further detail with reference to the accompanying drawings, in which the same elements in different figures are referred to by common reference numerals. The embodiments are illustrated by way of example and should not be construed to limit the present disclosure.

DETAILED DESCRIPTION

Embodiments of the present disclosure provide techniques for generating and providing real-time optimized savings recommendations using digital nudges during a checkout process and before the purchaser completes a purchase.

In one or more embodiments, the disclosed principles provide a practical and technological solution to develop a behavioral savings system as a user behavior guiding tool that generates and provides real-time optimized savings recommendations using digital nudges that are designed to influence and facilitate a purchaser (herein referred to as a user) into making mindful decisions at the point of purchase. The tool may ultimately change user behavior to improve savings efforts by choosing optimized savings recommendations to optimize his/her spending, while ensuring consistency and usability of the user checkout process.

In one or more embodiments, the behavioral savings system may be executed by a process on a computer server to provide a real-time nudging service through a web browser plugin interacting with a shopping platform that cooperates with the user's online banking service. The web browser plugin may be executed to interact with the shopping platform to collect real-time pre-transaction user behavior data on the shopping platform associated with multiple user accounts. The behavioral savings system processes user data and per-transaction user behavior data to generate real-time optimized savings recommendations with personalized digital nudges, which are inserted and presented on one or more shopping platform graphical user interfaces. The behavioral savings system may also generate nudging user interfaces to present real-time optimized savings recommendations with personalized digital nudges in response to ongoing user navigation and checkout actions. The personalized digital nudges are designed to influence and facilitate the user into making decisions and behavioral changes to achieve smarter spending habits and achieve savings goals by optimizing spending during the checkout process.

Figure 1:
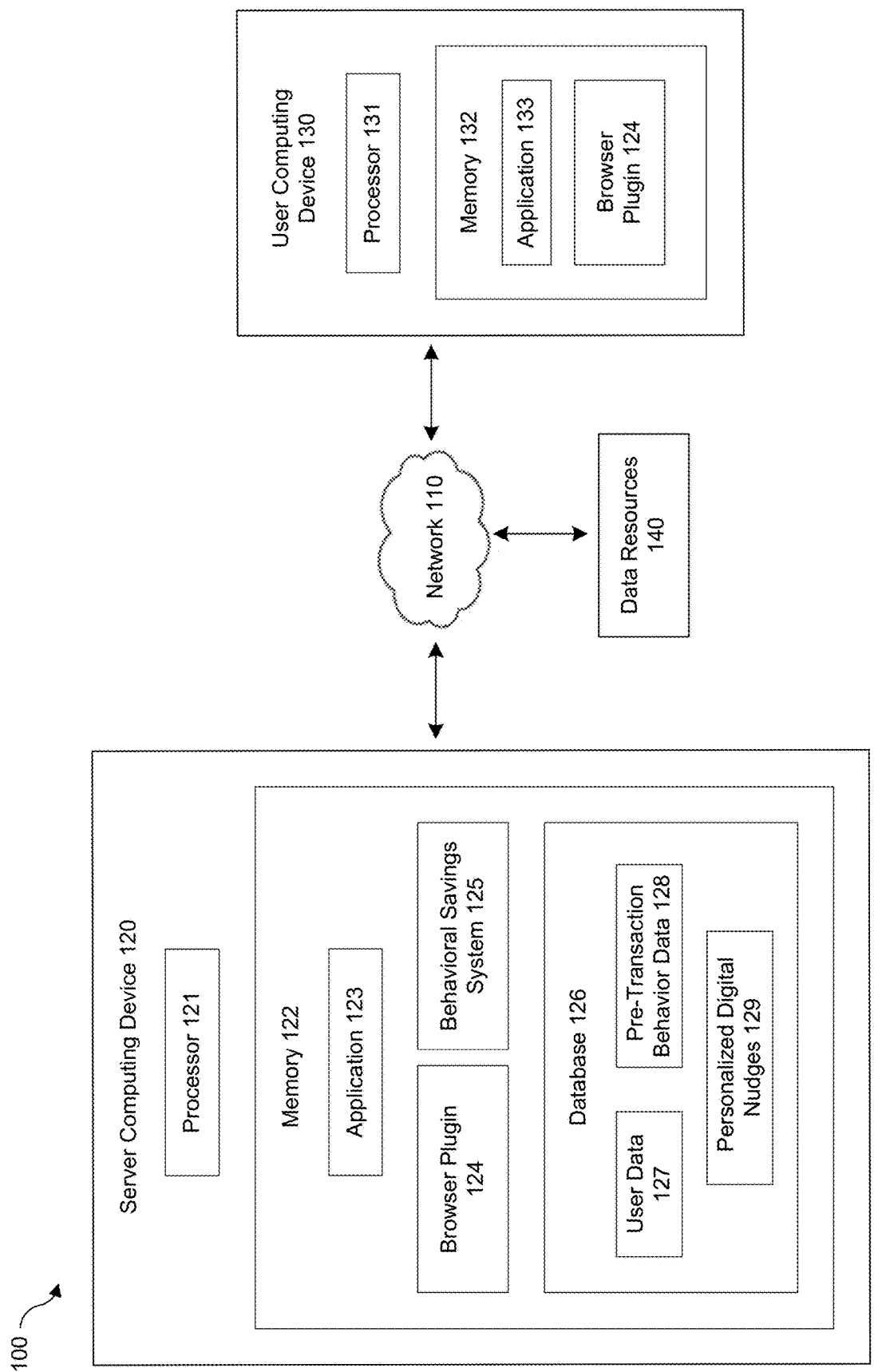
FIG. 1 illustrates an example computing system in accordance with some embodiments disclosed herein.

FIG. 1 illustrates an example computing system 100 for generating digital behavioral nudges in accordance with the disclosed principles. The example computing system 100 includes a server computing device 120 (or a server computer), a plurality of user computing devices 130 (although only one is illustrated), data sources 140 that may be communicatively connected to one another in a cloud-based or hosted environment by a network 110. The network 110 may include the Internet and/or other public or private networks or combinations thereof.

The server computing device 120 includes a processor 121, memory 122 and communication interface for enabling communication over the network 110. The server computing device 120 hosts one or more online software financial services or software products, which may be indicative of one or more applications 123, a web browser plugin 124 and a behavioral savings system 125. The memory 122 may store the one or more applications 123, web browser plugin 124 and behavioral savings system 125, and other programs and models, which are implemented through computer-executable instructions executed by the processor 121 for implementing the computing systems, methods, processes, and embodiments described herein. Generally, computer-executable instructions include software programs, objects, models, components, data structures, and the like that perform functions or implement particular data types. The computer-executable instructions may be stored in a memory communicatively coupled to the processor 121 and executed by the processor to perform one or more methods described herein.

When executed, the one or more applications 123 provide financial management services and or one or more websites with services for users to manage their financial accounts and transactions. In one embodiment, the applications 123 include the financial management Mint® application or website provided by Intuit Inc., of Mountain View, Calif. The one or more applications 123 may continuously receive and update transaction data and related user behavior data from the data sources 140 (e.g., financial services or financial institutions) via the network 110. For example, the online personal finance management application utilizes financial data from banks, companies, and financial institutions to provide personal finance management services. With the financial data, the personal finance management website may allow a user to organize and monitor user accounts, transactions, user behaviors and activities at multiple financial institutions.

The web browser plugin 124 may be an extension program implemented as a smart spender or an extension program that can be downloaded from the server computing device 120 and installed on a user computing device 130. The user computing device 130 may install and execute the web browser plugin 124 or use content filtering, a Virtual Private Network (VPN) to access a shopping platform (e.g., a merchant website) or the related mobile application via the network 110. The web browser plugin 124 may be executed in response to user interactions with the web browser and the shopping platform by adding specific features and providing personalized software capabilities and functions to adapt to the user's specific preferences when the user logs in and interacts with the shopping platform via the web browser. A host software application (of applications 123) may provide services the web browser plugin 124 that can interact with and exchange data with the shopping platform and the host software application 123. The host software application may operate independently of the web browser plugin 124. The web browser plugin 124 may provide one or more graphical user interfaces (GUIs) interacting with the corresponding shopping platform to adapt to different users and user actions by providing personalized functions though the GUIs. In some embodiments, the web browser plugin 124 will expand a web browser's functionality by providing specific functional components executed to comply with the web browser or mobile application to access to the user account, navigate a website, exchange data with the website and respond to user actions. For example, specific functional components provided by the web browser plugin 124 may include toolbars, selectable user interface elements, behavioral nudging elements, digital nudges, or other useful functional elements. In one or more embodiments, the plugin 124 will be executed to interact with the shopping platform to provide a digital nudging service to facilitate the user into making mindful decisions and changing user spending behavior to meet a savings goal (i.e., by optimizing spending).

The processor 121 will monitor user navigation and checkout behavior or actions on the shopping platform via the web browser plugin 124. The processor 121 will collect real-time pre-transaction behavior data associated with respective user navigation and checkout behavior and or other actions. These actions include logging in on the shopping platform, searching for items, adding items to the corresponding shopping cart, updating items in the shopping cart, making a purchase, etc.

The behavioral savings system 125 may be a software modeling system including computer-executable instructions to be executed on the server computing device 120 to implement model components, processes, and embodiments described below. The behavioral savings system 125 will be configured to process user data 127 and per-transaction user behavior data 128 to generate personalized digital nudges 129 to be presented to the user through the web browser plugin 124. As described in more detail below, the personalized digital nudges 129 may include a digital nudge description and contextual questions related to user data features, and selectable user interface elements to influence and facilitate the user into making purchase time decisions that will change user behavior and hopefully optimize spending. The personalized digital nudges 129 may include data features, correlated data features of user accounts, transaction data and user behavior data. The behavioral savings system 125 will present the personalized digital nudges through the web browser plugin 124 to nudge and influence the user into make decisions and behavioral changes to fulfill the savings goals (e.g., nudging goals) by optimizing spending. Goals may include increasing user account savings, arranging balance payments to user financial accounts, and suggesting payment methods to lower financial charges of user financial accounts, etc.

A user computing device 130 may include a processor 131, memory 132, and an application or application browser 133. For example, a user device 130 may be a smartphone, personal computer, tablet, laptop computer, or other mobile device. Users may be associated with a large group of individuals and business entities with user registered financial accounts of various financial intuitions and an online financial application or software service. Users may have registered accounts to make purchases and transactions on a shopping platform or a corresponding mobile application. Each user may create a user account with user information for subscribing to the service and accessing a particular product or service provided by server computing device 120.

Figure 2:
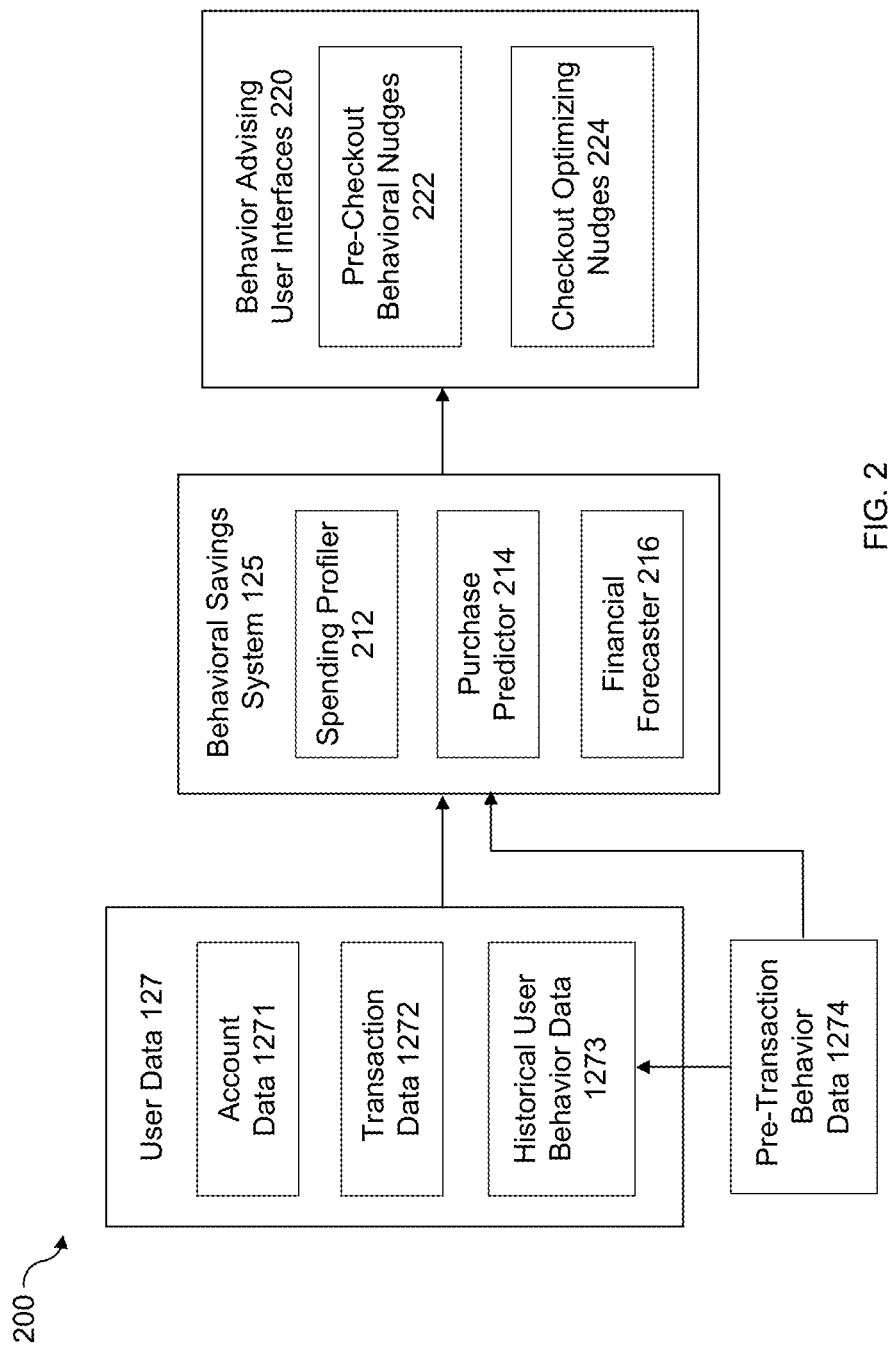
FIG. 2 illustrates a block diagram of an example behavior advising system in accordance with some embodiments disclosed herein.

Database 126 may be a data storage device included in the server computing device 120 or coupled to or in communication with the processor 121 of the server computing device 120 via the network 110. Database 126 may store and update user data 127 from online services, shopping websites and financial institutions via the network 110. User data may be associated with user registered accounts, respective transaction data and transaction behaviors represented by semantic features. Semantic features may be represented by a number, natural language words, terms, text, phrases, sentences, etc. As shown in FIG. 2, the user data 127 may include, but is not limited to, four groups of data features: 1) account data 1271; 2) transaction data 1272; 3) historical user behavior data 1273 associated with historical transactions; and 4) pre-transaction user behavior data 1274 associated with an ongoing checkout.

Account data 1271 includes financial data from the user's financial accounts. User financial accounts may include user savings accounts, checking accounts, credit card accounts, and any other types of payment accounts. Account data 1271 may include, but is not limited to, a plurality of data features, such as a user identifier (ID), an account number, cash flow, account balances, payment due dates of financial cards accounts, interest charges of the financial card accounts, savings goals, budgets, credit scores, spending trend data, etc. Account data 1271 is associated with transaction data 1272 of corresponding user accounts and corresponding historical user behavior data 1273.

Transaction data 1272 includes a plurality of categorical transaction feature datasets between respective user accounts and merchants. Transaction data 1272 may include, but is not limited to, a plurality of feature datasets, such as transaction account type (e.g., ACH, credit card, debit card), transaction time, transaction amount, transaction description, a user ID, merchant name, zip code, city, state, item data (name, quantity, type, price, category), IP address, etc.

A user may log into the shopping platform or website with registered account information and navigate the shopping platform through the user computing device 130 to search for items and make purchases. The user behavior data may represent the user's interactions with the shopping platform or mobile application through the user computing device 130. The user behavior data may be collected by the server computing device 120 through the web browser plugin 124.

Historical user behavior data 1273 is associated with user account data 1271 and transaction data 1272 of respective historical transactions. Historical user behavior data 1273 may represent user interactions with a shopping platform (e.g., Amazon website) or the corresponding mobile application during the respective historical transitions. Historical user behavior data 1273 may include, but is not limited to, a plurality of feature datasets, such as navigation time of day, shopping platforms or websites, checkout item data (e.g., name, quantity, brand, type, price, category), frequency of updating a shopping cart, user shopping mood state, shopping session duration, location, etc. The user shopping mood state may be one of states of user's response to respective transaction experience, such as "extremely unhappy," "moderately unhappy," "slightly unhappy," "neither happy nor unhappy," "slightly happy," "moderately happy," and "extremely happy".

Pre-transaction user behavior data 1274 includes real-time user behavior data representing a user's navigational actions and shopping cart data during an ongoing checkout process. Pre-transaction user behavior data 1274 may be collected by the server computing device 120 through the web browser plugin 124 during the ongoing checkout process. Pre-transaction user behavior data 1274 may include, but is not limited to, a plurality of data features, such as time of day, website being used, time spent in a shopping cart, time since last purchase of similar type of items, shopping cart or checkout item data, user shopping mood state (extremely unhappy, moderately unhappy, slightly unhappy, neither happy nor unhappy, slightly happy, moderately happy, and extremely happy), item data of checkout items, location, wish list, services, etc. Checkout item data may include data for each product in the shopping cart for the ongoing session, such as an item name, item quantity, item price, item category, item type, item brand, and any other related item data.

FIG. 2 illustrates a block diagram of an example system 200 for influencing and facilitating users into making decisions to optimize spending in accordance with some embodiments of the present disclosure. The processor 121 may execute the behavioral savings system 125 to receive and process user data 127 and pre-transaction behavior data 1274 to generate different optimized savings recommendations with personalized digital nudges, which may influence the user into make different purchasing decisions or change the user's behavior concerning whether to remove or update one or more items in its shopping cart and or complete the checkout process. As illustrated in FIG. 2, the behavioral savings system 125 may include various functional models, such as a spending profiler 212, purchase predictor 214 and or financial forecaster 216.

The spending profiler 212 processes the user data 127 to generate user profiles or user spending profiles for respective users. Each user profile or user spending profile may include a plurality of habitual spending features representing correlated contextual data features associated with the account data 1271, transaction data 1272 and historical user behavior data 1273. The habitual spending features may include contextual data features, such as time of day, time from last purchase, times of purchases with each related shopping platform, shopping duration with each related shopping platform, a total amount of purchase with each related shopping platform, user mood state associated with respective previous transaction, etc. The spending profiler 212 may process and classify the user data 127 to obtain the habitual spending features for each user profile. For example, the habitual spending features of a user profile may be generated by obtaining four groups or vectors of data, including but not limited to:

1) habitual spending data based on a spending frequency during various time segments (hour of day and day of the week), purchase amount, and item category to score shoppers from minimal to large spenders,
2) satisfaction ratios comparing pre-purchase and post-purchase satisfaction survey responses to score the users' level of buyers regret and represent users' expectation of value and happiness from the purchase,
3) a measure of time spent researching or contemplating items before a final purchase to score the users' level of prudence relative to the purchase price and typical shopping cart features, such as "save for later" or wish lists, and
4) personalized motivation data for measuring user purchase intent and historical data based on other product details, such as brand loyalty, discounts, kids, and other related key social indicators.

The purchase predictor 214 processes user data 127 including: 1) account data 1271; 2) transaction data 1272; and 3) historical user behavior data 1273 to predict the likelihood of a similar future purchase based on the user profile from the spending profiler 212. For example, the purchase predictor 214 may be executed to analyze user income and spending data from transactions over the past 3-month period to generate frequency volatility features of transactions that occurred in different spending categories, such as a coffee shop, fast food or other restaurants, etc. The spending trend data may be used to validate user profiles for predicting user spending in the future. The spending trend data may include a frequency of transactions associated with similar items. The spending trend data may be used to provide the likelihood predictions on when and where the user may make similar purchases in the future. In one or more embodiments, the likelihood of a similar future purchase may be obtained by comparing the pre-transaction user behavior data 1274 at the time of checkout of the current shopping session with data of the user spending profile. For example, the purchase predictor 214 may generate a likelihood score for the current shopping session to represent the likelihood of purchase by comparing the pre-transaction user behavior data 1274 of the current shopping session data against data including: 1) habitual spending data, 2) satisfaction ratios, and 3) a measure of time for searching items. The current shopping session may be scored by identifying whether the checkout item data of the current shopping session matches the corresponding personalized motivation data.

The financial forecaster 216 processes the user profile from the spending profiler 212, the spending trend data from the purchase predictor 214, and the pre-transaction user behavior data 1274 to generate personalized digital nudges. In one or more embodiments, the personalized digital nudges will be presented to the user on behavior nudging user interfaces 220 in response to user navigation and checkout actions on the shopping platform via the web browser plugin 124. The type and content of the personalized digital nudges may be generated by evaluating cash flow analysis of the user financial accounts associated with the financial management application, the likelihood of purchase (e.g., a likelihood score of the current shopping session), and user spending profile. The financial forecaster 216 will determine whether and when to nudge the or intervene during the process based on a likelihood score of the current shopping session. In one example, if a likelihood score for the current shopping session is high and the purchase amount is more than the savings currently in the user's bank account (or a projected end-of-month amount based on expected paychecks), the system may generate nudges to nudge the user aggressively and communicate the expected actual cost from fees and interest occurred by purchasing using credit. In another example, if a likelihood score for the current shopping session is low and the purchase price is below a percentage threshold of the user's bank accounts, the financial forecaster 216 may not generate the nudges related to savings or may instead nudge the user to encourage buying the current cart (over other sessions).

The behavior nudging user interfaces 220 may include pre-checkout behavioral nudges 222 (e.g., pre-checkout nudging elements) and or checkout optimizing nudges 224 (e.g., checkout nudging elements). These personalized nudges may be presented to the user during the checkout process. The user's savings goals (e.g., optimizing spending) may be achieved by providing real-time optimized behavior savings recommendations through the web browser plugin 124 at the time of checkout. The real-time optimized behavior savings recommendations may be implemented by providing a personalized instant savings, a debt payoff or credit building option to optimize the payment for one or more checkout items. Details about corresponding processes related to the behavioral savings system 125 will be described below.

Figure 3:
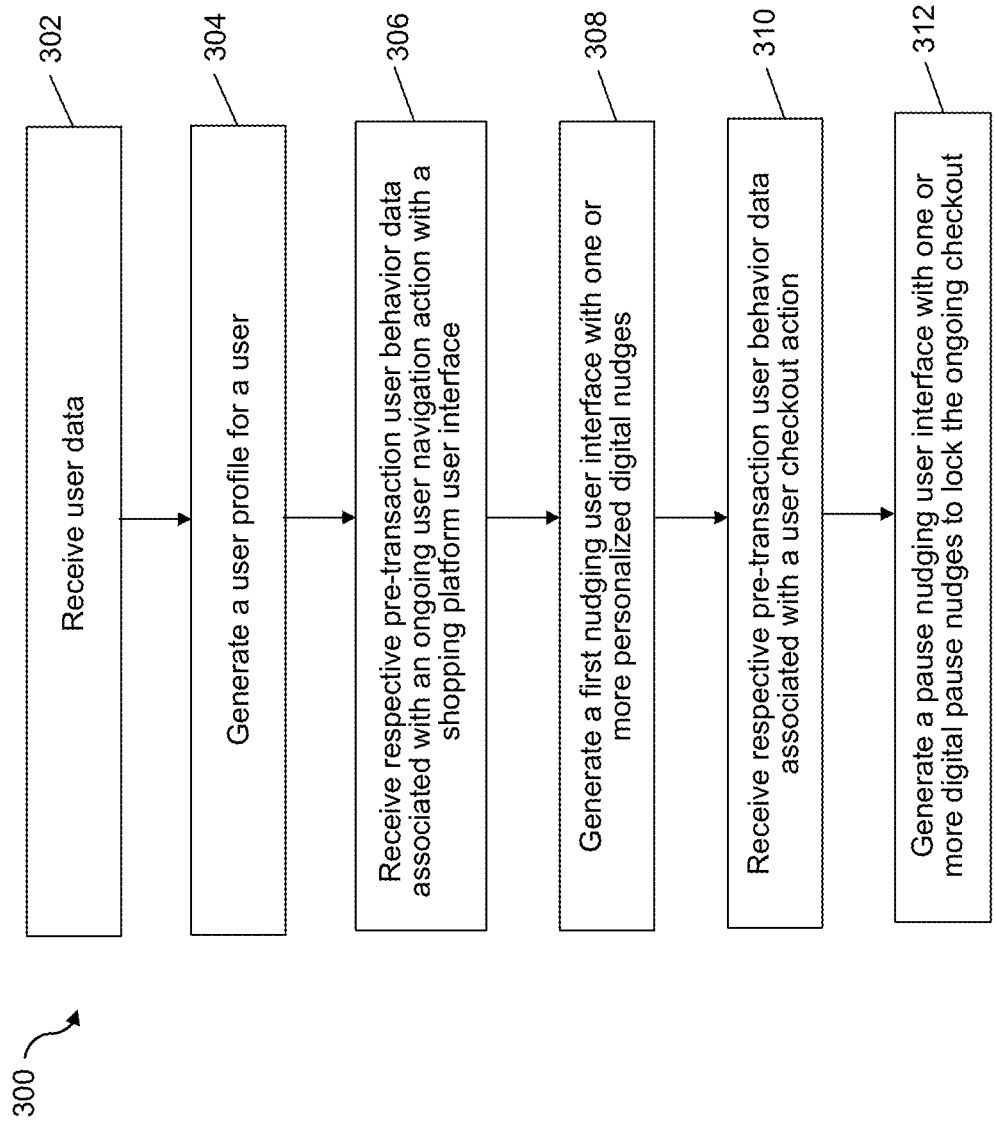
FIG. 3 is a flowchart illustrating an example method for generating personalized digital nudges directed to user savings behavior in accordance with some embodiments disclosed herein.

FIG. 3 is a flowchart illustrating an example method 300 for generating personalized digital nudges in response to ongoing user navigation actions according to some embodiments disclosed herein. The method 300 may be implemented as one or more computer programs executed by the processor 121 on server computing device 120. The order of the operations described herein is not intended to be construed as a limitation, and any number of the described operations can be combined in any order and/or in parallel to implement the method 300.

At 302, the processor 121 receives user data 127, including user account data 1271, transaction data 1272, and historical user behavior data 1273 from the database 126.

At 304, referring also to FIG. 2, the processor 121 executes the behavioral savings system 125 to process user account data 1271, transaction data 1272 and the historical user behavior data 1273 to generate a user profile for each user. Each user profile may include a plurality of habitual spending features associated with the account data 1271, transaction data 1272, and historical user behavior data 1273. The user profile may include data from previous nudges provided to the user and the user moods or behaviors of how the user reacted to the previous nudges. In some embodiments, the processor 121 may generate spending trend data of items within the transaction data through the financial application during a prior period of time.

At 306, the processor 121 detects a first trigger event of one or more ongoing user navigation actions with a shopping platform through the web browser plugin 124 executed on a user computing device 130. In one or more embodiments, the first trigger event may include a user login action with a user registered account on the shopping platform. In one or more embodiments, the first trigger event may include a user navigation action of searching for one or more items on the shopping platform. The processor 121 may receive corresponding real-time pre-transaction user behavior data 1274 associated with the ongoing user navigation action through the web browser plugin 124. The processor 121 may send and store pre-transaction user behavior data 1274 in the database 126 in real-time.

At 308, in response to detecting the first trigger event, the processor 121 generates a first nudging user interface with a first group of personalized digital nudges based on the habitual spending features of the user profile. Referring also to FIG. 2, the first group of personalized digital nudges may represent the pre-checkout behavioral nudges 222. The processor 121 may generate a first nudging user interface to present the first group of the personalized digital nudges to the user on the user computing device 130 through the web browser plugin 124. The processor outputs the first nudging user interface to a user device to be displayed with the shopping platform user interface.

Figure 4:
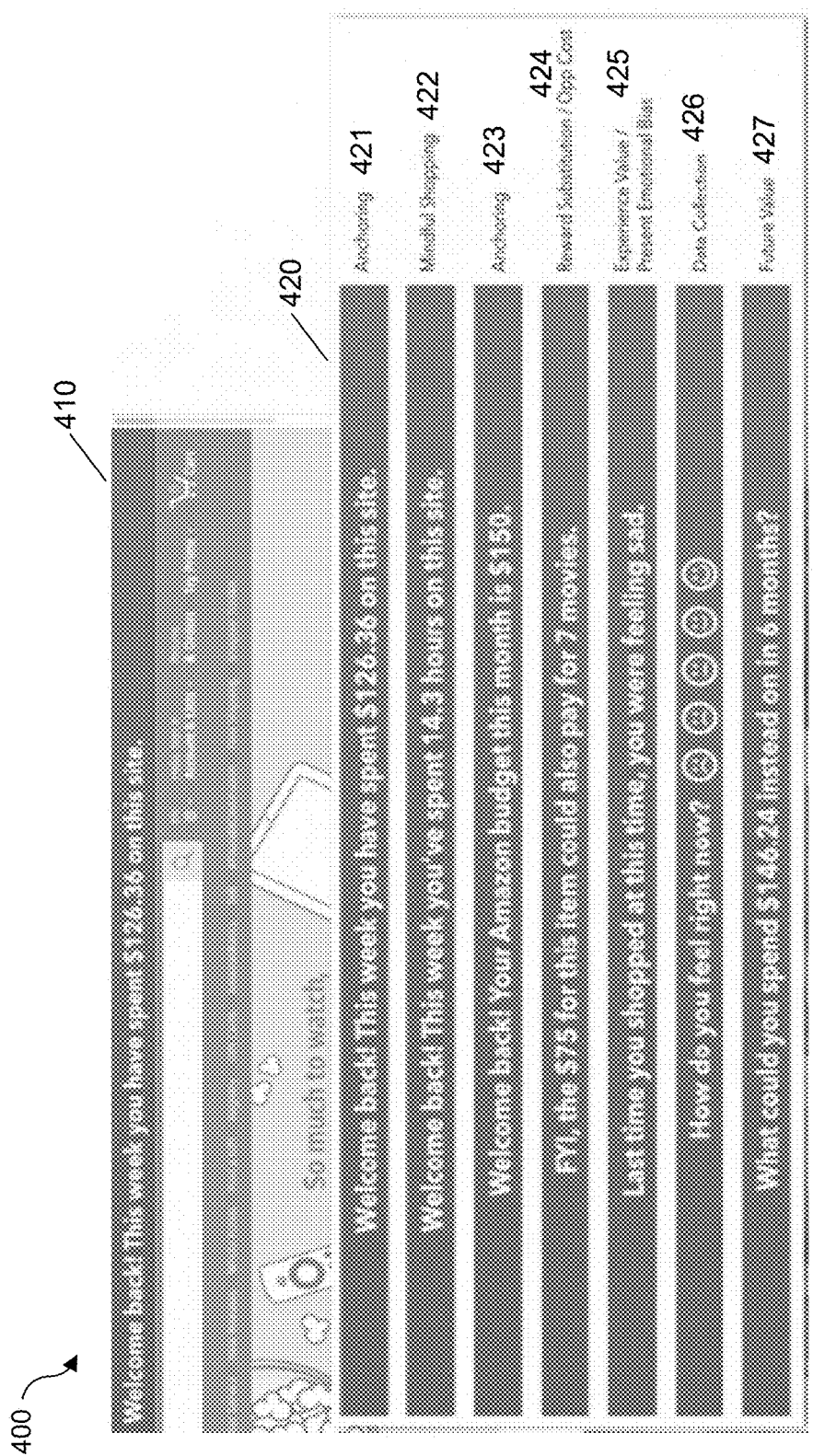
FIG. 4 shows an example graphical user interface including a group of personalized digital nudges in accordance with some embodiments disclosed herein.

FIG. 4 shows an example graphical user interface 400 including the first nudging user interface with a first group of personalized digital nudges in accordance with some embodiments disclosed herein. The example user interface 400 includes an online shopping platform user interface 410 with a nudging user interface 420. The first nudging user interface 420 is overlapped with the online shopping platform user interface 410. For example, the processor 121 may insert and present the first nudging user interface 420 with the first group of personalized digital nudges 421-427 into the online shopping platform user interface 410. In the illustrated example, the nudging user interface 420 includes a plurality of digital contextual nudges 421-427 designed to nudge the user in accordance with the disclosed principles. The digital nudges 421-427 may include user spending data and the related natural language contextual nudge data, questions, and one or more selectable user interface elements for receiving user responses. For example, the digital nudges 421-427 may include, but are not limited to:

1) a spending summary 421 during a past period (e.g., week, month, etc.), (often referred to as an "anchoring" behavioral nudge, e.g., "Welcome back! This week you have spent $126.36 on this site"),
2) a navigation time 422 of the user's interactions with the shopping platform during a past period of time (often referred to as a "mindful shopping" behavioral nudge, e.g., "Welcome back! This week you've spent 14.3 hours on this site"),
3) a suggested savings goal 423 (e.g., suggested budget) to spend an amount of money on the shopping platform for a future period of time (often referred to as an "anchoring" behavioral nudge, e.g., "Welcome back! Your Amazon budget this month is $150"),
4) suggested actions 424 about one or more items related to the ongoing user navigation action (often referred to as a "reward substitution" behavioral nudge, e.g., "FYI, the $75 for this item could also pay for 7 movies"),
5) a previous user mood state 425 associated with historical user behavior data 1273 (often referred to as an "experience value or present mood bias" behavioral nudge, e.g., "Last time you shopped at this time, you were feeling sad"), 6) a set of selectable user interface elements for the user to choose a real-time user mood state 426 with various happiness levels to collect user mood data for generating pre-transaction user behavior data 1274 (often referred to as a "data collection" behavioral nudge, e.g., "How do you feel right now?"), 7) one or more questions 427 designed to influence the user into making a mindful behavioral change to optimize spending (e.g., "What could you spend $146.24 instead on in 6 months?" to nudge the user with a spending value in the future), and 8) any other nudge data and questions associated with the ongoing user navigation actions.

In some embodiments, the processor 121 may receive real-time user mood state data and responses to the nudging questions 427 via the web browser plugin 124. The processor 121 may receive and store pre-transaction user behavior data 1274 with the user responses to user mood state 426 about the ongoing interaction and one or more nudging questions 427, and any other questions associated with the previous user actions in database 126.

At 310, the processor 121 may detect a second trigger event of a user checkout action related to one or more items in a shopping cart of the shopping platform. The web browser plugin 124 may monitor the current URL (e.g., a merchant website such as Amazon.com) or the checkout user interface to trigger events. In some cases, the web browser plugin 124 may monitor the network traffic triggered by user actions, such as a click or change made on a web page. The processor 121 may receive corresponding real-time pre-transaction user behavior data 1274 related to one or more checkout items from the shopping platform user interface associated with the user checkout action via the web browser plugin 124.

At 312, in response to detecting the second trigger event of the user checkout action, the processor 121 executes the behavioral savings system 125 to determine real-time optimized savings recommendations with a second group of personalized digital nudges based on the user data and the pre-transaction user behavior data associated with the user checkout action. For example, the processor 121 may detect a user clicking on a "Buy Now" HTML element on the checkout user interface. The user checkout action may trigger the processor 121 to generate an interception of cart data and one or more personalized digital nudges that are presented on a display of the user computing device 130.

In some embodiments, the processor processes the pre-transaction user behavior data 1274 with the checkout item data to generate a pause nudging user interface with one or more digital pause nudges. The processor 121 may present a "pause nudging user interface" to the checkout interface to initially lock the user checkout action for a given period of time through the web browser plugin 124. The web browser plugin 124 may generate an asynchronous network call instead of refreshing the webpage to facilitate the user to navigate between the checkout user interface and pause nudging user interface.

Figure 5:
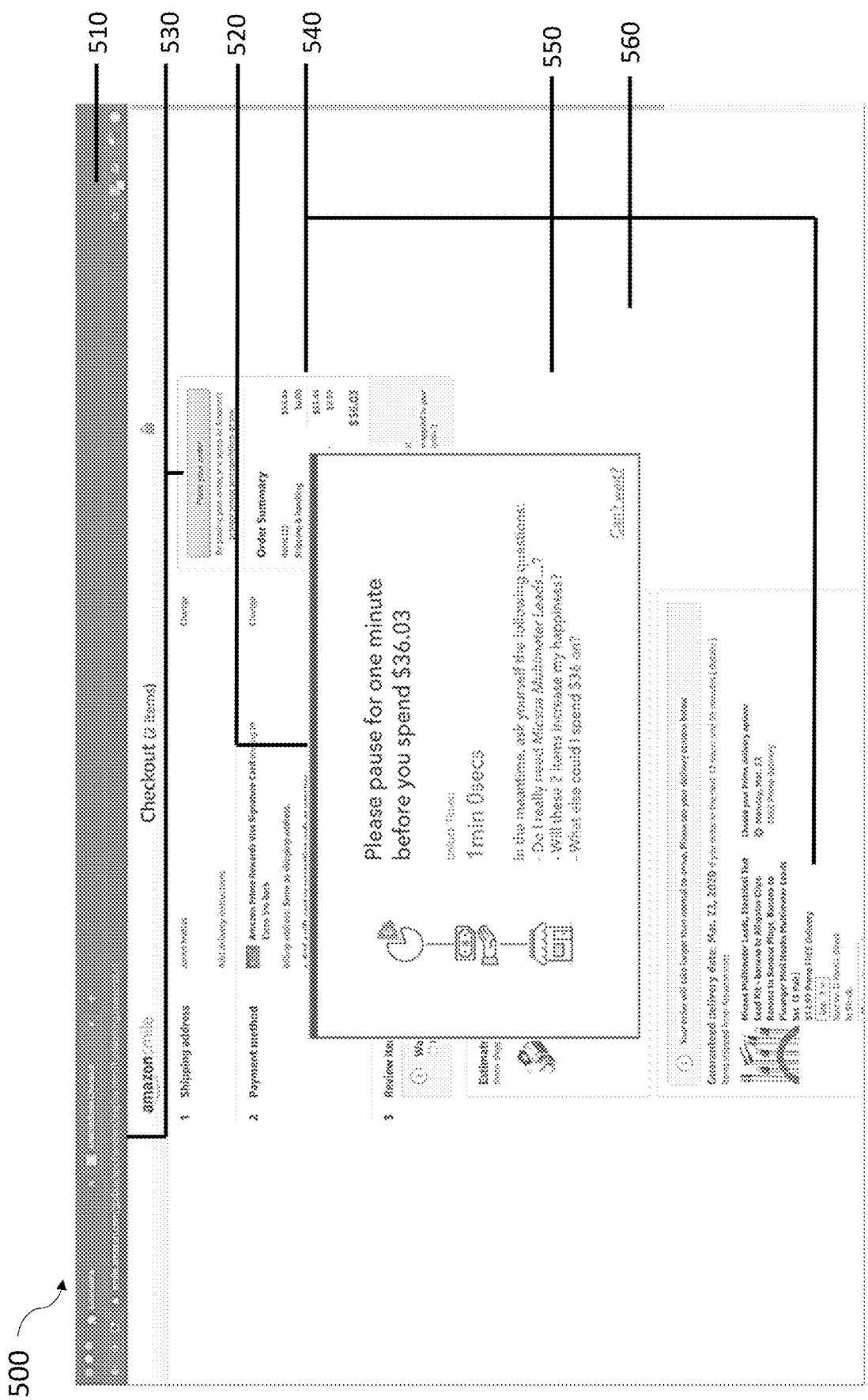
FIG. 5 shows an example graphical user interface including a group of example digital pause nudges that lock a checkout process in accordance with some embodiments disclosed herein.

FIG. 5 shows an example graphical user interface (GUI) 500 including a group of example digital pause nudges to lock a checkout process in accordance with some embodiments disclosed herein. The GUI 500 includes a checkout user interface 510 (i.e., a shopping platform user interface) and an example pause nudging user interface 520 with a group of personalized digital contextual nudges 550. The example pause nudging user interface 520 is overlapped with the checkout user interface 510. The GUI 500 may include an indicator or trigger 530 representing an asynchronous network call or URL for the user to access the checkout user interface 510 to e.g., change the quantity of an item in the shopping cart. The web browser plugin 124 may allow the user to access the checkout user interface 510 to place the purchase order by selecting the corresponding indicator or trigger 530. In some embodiments, when the browser plugin 124 is operated with a mobile application, the trigger may represent application launches, network traffic, and payload analysis, or a GPS location of the user computing device when the user enters a known retail location for habitual spending associated with the user profile. The group of personalized digital contextual nudges 550 may include contextual questions about the checkout item(s) and are designed to cause the user to pause, for a predetermined period of time, and think about the checkout item 540 before determining whether to complete the checkout process. The example contextual nudge questions are generated to nudge the user to evaluate whether he/she really needs the checkout item(s), whether the checkout item(s) increase the user's happiness, and or inform the user what else he/she may spend the money on, etc.

The processor 121 will automatically exit the pause nudging user interface 520 to unlock the user checkout action after the predetermined period of time. The processor 121 may also unlock the user checkout action in response to a user action to exit the pause nudging user interface 520. For example, the pause nudging user interface 520 may include a selectable user interface element 560 that, when selected by the user, allows the user to skip or exit the pause nudging user interface 520. If the selectable user interface element 560 is not selected by the user within the predefined unlock time (e.g., 1 minute, 30 seconds, 15 seconds), the pause nudging user interface 520 will be automatically closed.

Upon detecting an exit from or the closing of the pause nudging user interface 520, the system may generate personalized digital nudges indicative of an optimized behavioral savings suggestions or a savings goal in accordance with the disclosed principles.

Figure 6:
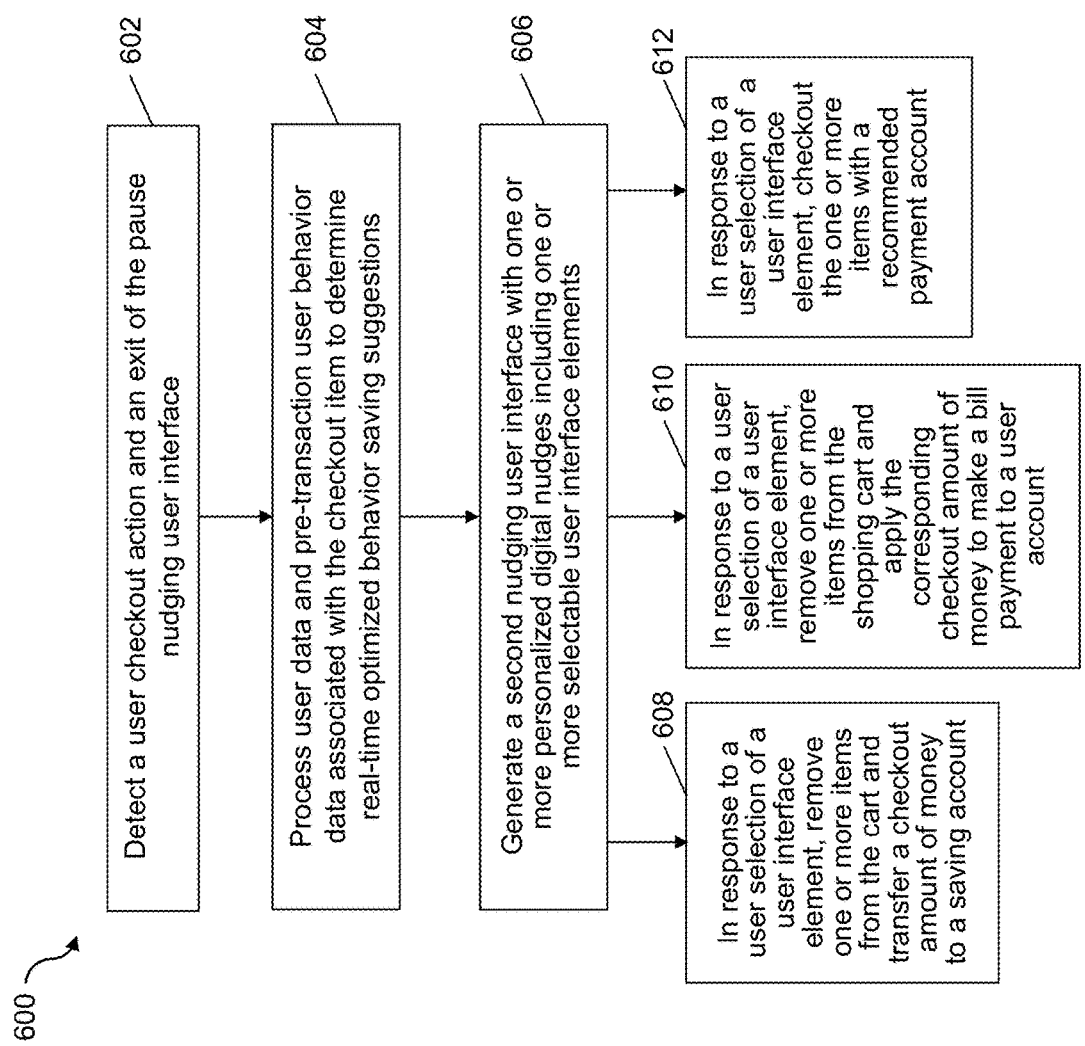
FIG. 6 is a flowchart illustrating an example method for generating and implementing real-time optimized savings recommendations as a suitable intervention to a checkout process in accordance with some embodiments.

FIG. 6 is a flowchart illustrating an example method 600 for generating and implementing real-time optimized savings recommendations or other options as a suitable intervention to a checkout process in accordance with some embodiments. The processor 121 executes the behavioral savings system 125 to generate a checkout related "nudging user interface" to nudge a user by providing real-time optimized behavioral savings suggestions to advise and influence user's behavioral changes while also ensuring that the user gets the best outcome for his/her financial accounts. The real-time optimized behavior savings suggestions may be provided for the user to determine whether to remove and or update the one or more items in the cart, or to complete the checkout process while simultaneously meeting the user's savings goals of optimizing spending. The method 600 may be implemented as one or more computer programs executed on the server computing device 120. The order of the operations described herein is not intended to be construed as a limitation, and any number of the described operations can be combined in any order and/or in parallel to implement the method 600.

At 602, the processor 121 detects the second trigger event i.e., a user checkout action and an exit or a close of the pause nudging user interface 520 via the web browser plugin 124.

At 604, in response to the detecting at 602, the processor 121 executes the behavioral savings system 125 to process user data 127 and the real-time pre-transaction user behavior data 1274, including the checkout item data, to determine real-time optimized behavior savings suggestions regarding the one or more items. The processor 121 may determine real-time optimized savings suggestions during the checkout process based on the user's habitual spending features, the spending trend of the item(s), and the pre-transaction user behavior data 1274, including the checkout item data. In some embodiments, the spending trend data may include a spending frequency of items similar to the one or more checkout items. The spending trend data may be used to evaluate the data of the similar checkout items to generate the real-time optimized savings recommendations regarding whether to check out the one or more items (e.g., for increasing savings and or optimizing spending).

In one embodiment, the processor 121 determines a first optimized savings suggestion to suggest that the user remove one or more checkout items and transfer a corresponding amount of money from a user's checking account to a user's saving account. In one embodiment, the processor 121 determines a second optimized savings suggestion to nudge the user to make a bill payment to a user account based on the balance due dates and interest charges of multiple user's accounts. In one embodiment, the processor 121 determines a third optimized savings suggestion to nudge the user with an optimized payment method with a lower interest charge based on the respective checkout amount, current balances, due dates, interest rates, transactions fees related to user data 127 associated with various user accounts and pre-transaction behavior data 1274.

At 606, the processor 121 may generate a second nudging user interface including real-time optimized behavior savings suggestions corresponding to a second group of personalized digital nudges through the web browser plugin 124. The second group of personalized digital nudges may be presented to and facilitate the user to make decisions and change user behaviors directed to respective optimized savings goals associated with various user's payment accounts. The second group of personalized digital nudges may include a set of selectable user interface elements that may be selected by a user to change user behavior and implement corresponding real-time optimized savings recommendations associated with respective user accounts.

Figure 7:
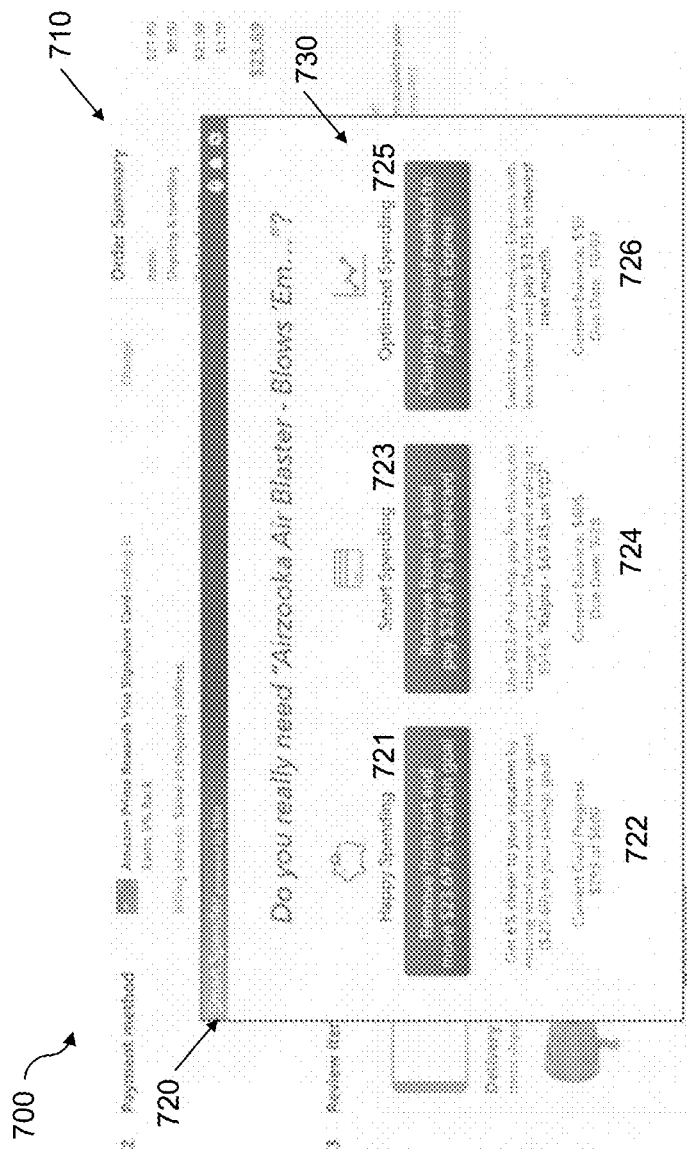
FIG. 7 shows an example graphical user interface presenting real-time optimized savings recommendations in accordance with some embodiments disclosed herein.

FIG. 7 shows an example graphical user interface 700 presenting real-time optimized savings recommendations in accordance with some embodiments disclosed herein. The example graphical user interface 700 includes a checkout user interface 710 (i.e., a shopping platform user interface) and a second nudging user interface 720. The second nudging user interface 720 may be overlapped with the checkout user interface 710. A second group of personalized digital nudges 730 may represent checkout optimizing nudges 224 (FIG. 2). The second nudging user interface 720 may present real-time optimized savings recommendations with the second group of personalized digital nudges 730. The second group of personalized digital nudges 730 may include a set of selectable user interface elements 721, 723, 725 and respective digital contextual nudges 722, 724, and 726. The user may be influenced by the digital contextual nudges 722, 724, 726 and select the corresponding one of the selectable user interface elements 721, 723, 725 for a respective optimized saving suggestion. In the illustrated example, the selectable user interface element 721 is a "Happy Spending" behavioral nudge with text "Remove from cart and move $23.69 to vacation goal." The respective digital contextual nudge 722 may include the related contextual description related to the savings goal, e.g., "Get 6% closer to your vacation by moving what you would have spent ($23.69) to your savings goal!" and "Current Goal Progress: $295 of $600". The illustrated selectable user interface element 723 is a "Smart Spending" behavioral nudge with text "Remove from cart and pay $23.69 to Mastercard." The respective digital contextual nudge 724 may include the related contextual description to nudge the user to make a bill payment to a user account, e.g., "Use $23.69 to help pay for this recent charge on your Mastercard ending in 5516: "Ralphs—$69.45 on September 7", "Current Balance: $405" and "Due Date: September 28." The illustrated selectable user interface element 725 is an "Optimized Spending" behavioral nudge with text "Change payment method to American Express." The respective digital contextual nudge 726 may include the related contextual description to nudge the user to make a payment to a user account with a lower interest charge, e.g., "Switch to your American Express with less interest and pay $3.55 in interest next month," "Current Balance: $55" and "Due Date: October 7."

At 608, as illustrated in FIG. 7, in response to a user selection of user interface element 721, the processor 121 may simultaneously remove one or more items from the shopping cart and automatically transfer the corresponding checkout amount of money from a user's checking account to a savings account. The automated savings may be implemented to generate the digital contextual nudges 722 to achieve one or more saving goals in various scenarios. In one scenario, the personalized digital contextual nudge 722 may be generated when the user profile shows that the user has not made a contribution to savings in over 30 days (or once a week, etc.) to develop habitual savings behavior. In one scenario, the personalized digital contextual nudges 722 may be generated when the savings in a user savings account is below a predefined percentage savings threshold (i.e., 50%, 75%, or 100%). In one scenario, the personalized digital contextual nudges 722 may be generated when the user shopping-to-savings ratio is high, or a forecasted cash flow is negative or too low to increase the savings.

At 610, as illustrated in FIG. 7, in response to a user selection of user interface element 723, the processor 121 simultaneously removes one or more items from the shopping cart and makes an optimized payment of the corresponding shopping cart amount to a user's credit card bill.

At 612, in response to a user selection of selectable user interface element 725 of the second nudging user interface 720, the processor 121 determines an optimized checkout payment method having less interest based on the respective checkout amount, current balances, due dates, interest rates, transactions fees related to user data 127 associated with various user accounts and pre-transaction behavior data 1274. As illustrated in FIG. 7, in response to the user selection of user interface element 725, the processor 121 may automatically change a default payment method and switch to an optimized payment method with less interest to pay the checkout amount.

The processor 121 may update the user data 127 in real-time based on the pre-transaction user behavior data and the transaction data associated with the user navigation actions and user checkout actions respectively.

The processor 121 may execute the behavioral savings system 125 to analyze user account data, historical transaction data, historical user behavior data and pre-transaction behavior to generate various nudging user interfaces with personalized digital nudges to provide real-time optimized savings recommendations during the user navigation and checkout processes. For example, the processor 121 may generate real-time optimized savings recommendations to nudge the user with smart mobile notifications to a user mobile computing device. The processor 121 may send real-time optimized savings recommendations through an online software service product or software application 123 via VPN or content filtering.

Figure 8:
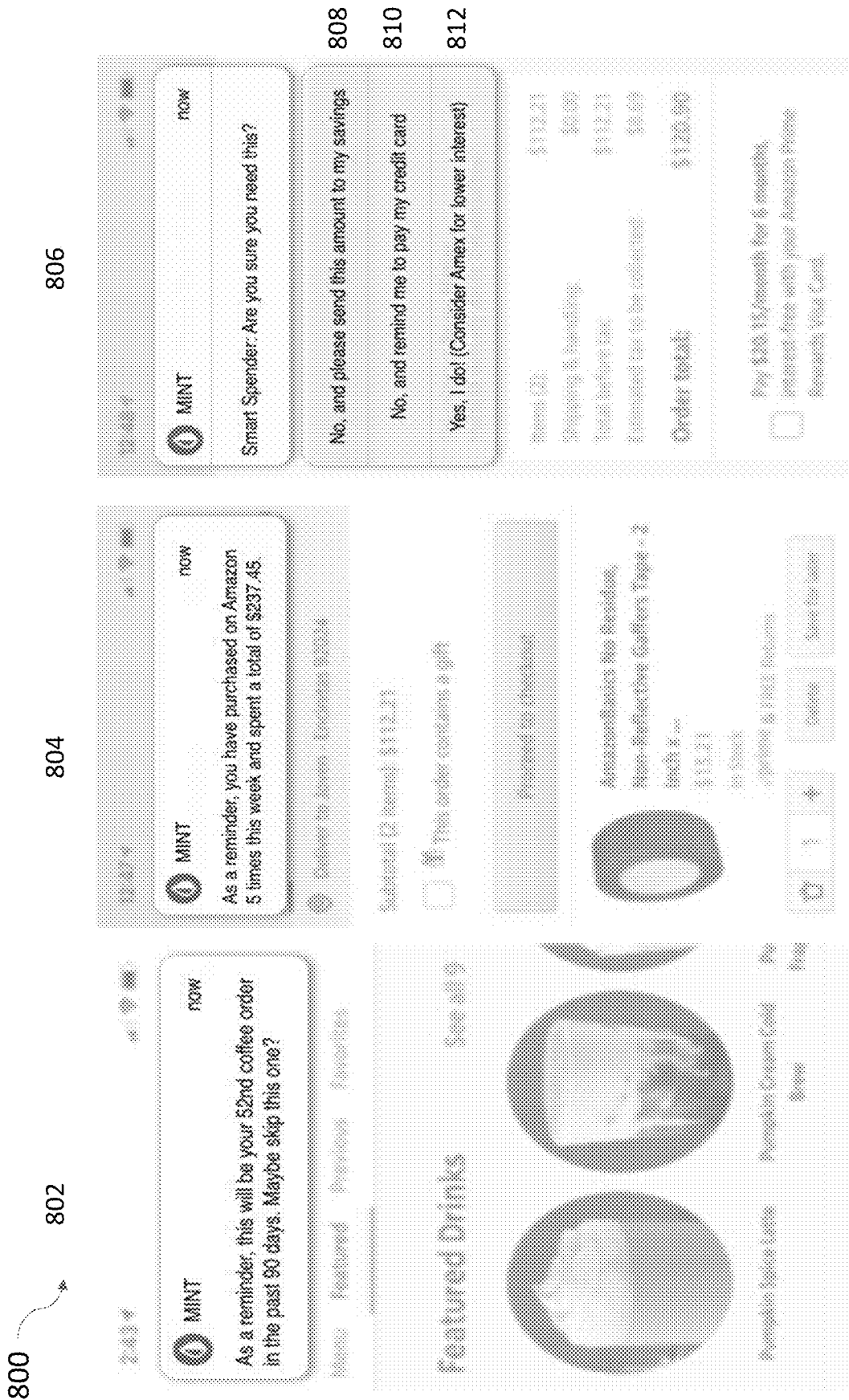
FIG. 8 shows another example graphical user interface with real-time optimized savings recommendations in accordance with some embodiments disclosed herein.

FIG. 8 shows another example graphical user interface 800 with real-time optimized savings recommendations via multiple personalized digital nudges. The multiple personalized digital nudges may be user interface elements and include contextual nudges 802, 804 and 806. The first contextual nudge 802 reflects historical user behavior such as a spending summary on an item and a suggestion about removing the checkout item. The contextual nudge 802 may include the related contextual description, e.g., "As a reminder, this will be your 52nd coffee order in the past 90 days. Maybe skip this one?" The second contextual nudge 804 represents the total user navigation time on a shopping platform during a past period of time, e.g., "As a reminder, you have purchased on Amazon 5 times this week and spent a total of $237.45." The third contextual nudge 806 may influence the user to choose one of optimized savings recommendations, e.g., "Smart Spender: Are you sure you need this?" The real-time optimized savings recommendations may be represented by personalized digital nudges corresponding to respective selectable user interface elements 808, 810, and 812. For example, in response to a user selection of the user interface element 808, the processor 121 simultaneously removes a checkout item and transfers a corresponding checkout amount of money from a user's checking account to a user saving account. In response to a user selection of the user interface element 810, the processor 121 simultaneously removes the checkout item and sends the user a reminder to pay a user credit card. In response to a user selection of the user interface element 812, the processor 121 may proceed the checkout with the suggest payment method (e.g., Amex for lower interest) to make a purchase of the checkout item.

The system may monitor the user behavior through the responses to the generated digital nudges and generate a plurality of features and status, such as "adding items to the shopping cart," "user actions to proceed checkout," "user pause actions," "user mood status," "percentage of returning to cart," "percentage to updating the cart," "percentage of making the purchase," The system may generate a savings report associated with respective user accounts based on the user behavior to respond to the generated digital nudges associated with the user navigation actions and user checkout actions. The behavioral savings system may generate the savings reports corresponding to respective user account periodically through the online software service product or software application 123.

Embodiments of the present disclosure provide several advantages and improvements in the technical fields of financial management systems by providing real-time financial behavioral savings suggestions to influence a user's decision making and facilitate behavioral changes directed to furthering expected savings goals. For example, the embodiments described herein: 1) process user data and real-time pre-transaction behavior data to generate real-time digital contextual nudges and nudging user interfaces to facilitate user decision making and behavioral changes during an online shopping process; 2) generate real-time optimized behavior savings suggestions to meet user's financial and purchase needs while ensuring consistency and usability of the user purchase checkout process before a final purchase; 3) generate nudging user interfaces with selectable user interface elements and personalized digital nudges to influence and facilitate the user to make mindful spending decisions or behavioral changes with real-time prompts of one button saving or bill pay at checkout; 4) implement real-time optimized savings recommendations in response to user selections by increasing user account savings, arranging balance payments to user financial accounts, and suggesting payment methods to lower financial charges of user financial accounts during an ongoing user purchase checkout process before the user makes a final purchase; and 5) help to avoid or decrease user overspending on nonessentials before a final purchase thereby meeting user savings goals of optimizing spending.

The disclosed embodiments may be directly applied to any shopping platforms or websites to provide real-time optimized savings recommendation as described above. The disclosed embodiments may be used in combination with related mobile shopping applications to influence and facilitate a user to make mindful spending decisions or behavioral changes for improving user savings before the user makes a final purchase payment during an ongoing checkout process. Any interaction with the nudges may lead the users to develop and or further their savings intentions. As such, the disclosed systems and processes are an advancement in the electronic financial services fields. Moreover, by presenting the personalized nudging interfaces on and or overlapping the shopping platform's user interfaces, the disclosed principles allow the user to interact with the nudges from a same, single screen view during the shopping and checkout processes. That is, the user is not navigated away from the shopping platform because all of the information/data needed to process the nudges and update its shopping cart is presented on or overlapping with the shopping platform user interface.

Figure 9:
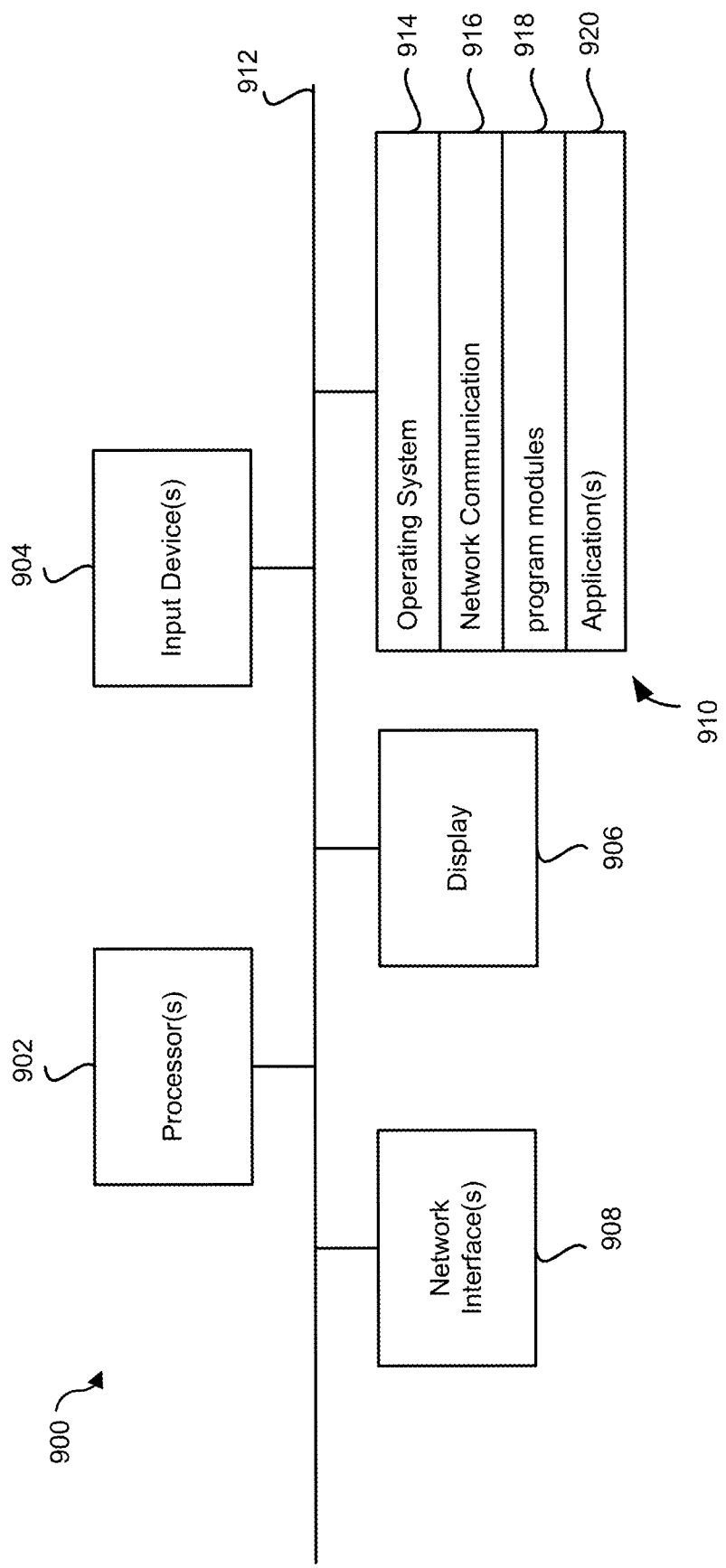
FIG. 9 is a block diagram of an example computing device in accordance with some embodiments disclosed herein.

FIG. 9 is a block diagram of an example computing device 900 that may be utilized to execute embodiments to implement processes including various features and functional operations as described herein. For example, computing device 900 may function as server computer 120, and user computing device 130 or a portion or combination thereof. In some implementations, the computing device 900 may include one or more processors 902, one or more input devices 904, one or more display devices or output devices 906, one or more communication interfaces 908, and memory 910. Each of these components may be coupled by bus 912, or in the case of distributed computer systems, one or more of these components may be located remotely and accessed via a network. The computing device 900 may be implemented on any digital device to execute software applications derived from program instructions stored in the memory 910, and includes but not limited to personal computers, servers, smartphones, media players, digital tablets, game consoles, email devices, etc.

Processor(s) 902 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Generally, a processor may receive instructions and data from a read-only memory or a random-access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-transitory memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

Input devices 904 may be any known input devices technology, including but not limited to a keyboard (including a virtual keyboard), mouse, track ball, and touch-sensitive pad or display. To provide for interaction with a user, the features and functional operations described in the disclosed embodiments may be implemented on a computer having a display device 906 such as a CRT (cathode ray tube) or LCD (liquid crystal display) monitor for displaying information to the user and a keyboard and a pointing device such as a mouse or a trackball by which the user can provide input to the computer. Display device 906 may be any known display technology, including but not limited to display devices using Liquid Crystal Display (LCD) or Light Emitting Diode (LED) technology.

Communication interfaces 908 may be configured to enable computing device 900 to communicate with other another computing or network device across a network, such as via a wired connection, a wireless connection, or a combination of wired and wireless connections. For example, communication interfaces 908 may include an Ethernet interface, an optical interface, a coaxial interface, an infrared interface, a radio frequency (RF) interface, a universal serial bus (USB) interface, a Wi-Fi interface, a cellular network interface, or the like.

Memory 910 may be any computer-readable medium that participates in providing computer program instructions and data to processor(s) 902 for execution, including without limitation, non-transitory computer-readable storage media (e.g., optical disks, magnetic disks, flash drives, etc.), or volatile media (e.g., SCRAM, ROM, etc.). Memory 910 may include various instructions for implementing an operating system 814 (e.g., Mac OS®, Windows®, Linux). The operating system may be multi-user, multiprocessing, multitasking, multithreading, real-time, and the like. The operating system may perform basic tasks, including but not limited to: recognizing inputs from input devices 904; sending output to display device 906; keeping track of files and directories on memory 910; controlling peripheral devices (e.g., disk drives, printers, etc.) which can be controlled directly or through an I/O controller; and managing traffic on bus 912. Bus 912 may be any known internal or external bus technology, including but not limited to ISA, EISA, PCI, PCI Express, USB, Serial ATA or FireWire.

Network communications instructions 916 may establish and maintain network connections (e.g., software applications for implementing communication protocols, such as TCP/IP, HTTP, Ethernet, telephony, etc.). Application(s) 920 and program modules 918 may include software application(s) and different functional program modules which are executed by processor(s) 902 to implement the processes described herein and/or other processes. For example, the program modules 918 may include a behavioral savings system 125 for process user data and pre-transaction behavior data to generate personalized digital nudges in real-time to facilitate behavior saving decisions by offering instant personalized savings, bill payment, and recommended payment methods. The program modules 918 may include but are not limited to software programs, machine learning models, objects, components, data structures that are configured to perform tasks or implement the processes described herein. The processes described herein may also be implemented in operating system 914.

The features and functional operations described in the disclosed embodiments may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

The described features and functional operations described in the disclosed embodiments may be implemented in a computer system that includes a back-end component, such as a data server, or that includes a middleware component, such as a server computer or an Internet server, or that includes a front-end component, such as a user device having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include user computing devices and server computers. A user computing device and server may generally be remote from each other and may typically interact through a network. The relationship of user computing devices and server computer may arise by virtue of computer programs running on the respective computers and having a client-server relationship to each other.

Communication between various network and computing devices 900 of a computing system may be facilitated by one or more application programming interfaces (APIs). APIs of system may be proprietary and/or may be examples available to those of ordinary skill in the art such as Amazon® Web Services (AWS) APIs or the like. The API may be implemented as one or more calls in program code that send or receive one or more parameters through a parameter list or other structure based on a call convention defined in an API specification document. One or more features and functional operations described in the disclosed embodiments may be implemented using an API. An API may define one or more parameters that are passed between an application and other software instructions/code (e.g., an operating system, library routine, function) that provides a service, that provides data, or that performs an operation or a computation. A parameter may be a constant, a key, a data structure, an object, an object class, a variable, a data type, a pointer, an array, a list, or another call.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method implemented by a server computing device, the server computing device comprising a processor and a memory, the memory storing executable instructions that when executed by the processor cause the processor to perform processing comprising:
   generating a user profile for a user based on user data comprising account data, transaction data and historical user behavior data, the user profile comprising a plurality of habitual spending features of the user data;
   receiving, via a nudging plugin application, pre-transaction user behavior data associated with an ongoing user navigation action with a shopping platform user interface;
   generating, based on the user profile and the pre-transaction user behavior data associated with the ongoing user navigation action, a first nudging user interface with one or more personalized digital nudges to present the user's habitual spending features;
   outputting the first nudging user interface to a user device to be displayed with the shopping platform user interface using the nudging plugin application;
   receiving, via the nudging plugin application, respective pre-transaction user behavior data related to one or more checkout items from the shopping platform user interface associated with a user checkout action;
   generating a second nudging user interface with one or more personalized digital nudges that provide real-time optimized savings recommendations based on the user data and the pre-transaction user behavior data associated with the user checkout action; and
   outputting the second nudging user interface to the user device to be displayed with a checkout portion of the shopping platform user interface using the nudging plugin application.

2. The method of claim 1, wherein the processing further comprises:
   analyzing the transaction data and the historical user behavior data to generate the user habitual spending features during a past period of time;
   generating a spending trend of an item of the transaction data during the past period of time, the spending trend of the item comprising a spending frequency of the item similar to the one or more checkout items; and
   updating the user profile to include the habitual spending features and the spending trend of the item of the transaction data during the past period of time.

3. The method of claim 2, wherein the processing further comprises:
   receiving respective pre-transaction user behavior data associated with the ongoing user navigation action and the user checkout action through the user device, the user device executing the nudging plugin application to interact with the shopping platform user interface, the respective pre-transaction user behavior data comprising navigation times, data of one or more checkout items, user shopping mood state, and shopping session duration; and
   processing the user habitual spending features, the spending trend of the item of the transaction data, and the pre-transaction user behavior data to determine the real-time optimized savings recommendations.

4. The method of claim 1, wherein the one or more personalized digital nudges of the second nudging user interface comprises one or more selectable user interface elements enabled to change user behaviors to implement respective real-time optimized savings recommendations associated with respective user accounts.

5. The method of claim 4, wherein generating the second nudging user interface comprises:
   determining a first real-time optimized saving suggestion as a first selectable user interface element to achieve an instant savings goal in real-time; and
   in response to a user selection of the first selectable user interface element, simultaneously removing the one or more checkout items and transferring a checkout amount from the user's checking account to the user's saving account.

6. The method of claim 4, wherein generating the second nudging user interface comprises:
   determining a first real-time optimized saving suggestion as a first selectable user interface element to make a payment to one of the user accounts based on balance due dates and interest charges of the user accounts; and
   in response to a user selection of the first selectable user interface element, simultaneously removing the one or more checkout items and making the payment of a checkout amount from the user's checking account to one of the user accounts.

7. The method of claim 4, wherein generating the second nudging user interface comprises:
   determining a first real-time optimized saving suggestion with an optimized payment method as a first selectable user interface element based on balance due dates and interest charges of the user accounts; and
   in response to a user selection of the first selectable user interface element, switching to the optimized payment method associated with one of the user accounts with a lower interest charge to purchase the one or more checkout items.

8. The method of claim 1, wherein the processing further comprises:
   analyzing the pre-transaction user behavior data associated with the one or more checkout items to generate a pause nudging user interface with one or more digital pause nudges to lock the user checkout action for a given period of time, the pause nudging user interface being overlapped with the shopping platform user interface, the one or more digital pause nudges comprising contextual data related to the one or more checkout items to influence the user to determine whether to check out the one or more checkout items; and
   unlocking the user checkout action after the given period of time or exiting the pause nudging user interface based on a user interaction with the pause nudging user interface.

9. The method of claim 1, wherein the first nudging user interface is overlapped with the shopping platform user

19 interface, and the second nudging user interface is overlapped with the shopping platform user interface.

10. The method of claim 1, wherein the first nudging user interface includes one or more user interface elements of:
- a spending summary on the shopping platform during a past period of time,
- a suggested budget for a future period of time,
- suggested actions about one or more items related to the ongoing user navigation action,
- a previous user mood state associated with the historical user behavior data,
- a set of selectable user interface elements for the user to choose a real-time ongoing user mood state, and
- one or more nudging questions to influence the user to make mindful behavioral changes to optimize spending.

11. A computing system, comprising:
- a server computing device comprising a processor and a memory; and
- a database in communication with the processor and configured to store user data associated with multiple user accounts, the memory storing computer-executable instructions that are executed by the processor to cause the processor to perform processing comprising:
- generating a user profile for a user based on user data comprising account data, transaction data and historical user behavior data, the user profile comprising a plurality of habitual spending features of the user data;
- receiving, via a nudging plugin application, pre-transaction user behavior data associated with an ongoing user navigation action with a shopping platform user interface;
- generating, based on the user profile and the pre-transaction user behavior data associated with the ongoing user navigation action, a first nudging user interface with one or more personalized digital nudges to present the user's habitual spending features;
- outputting the first nudging user interface to a user device to be displayed with the shopping platform user interface using the nudging plugin application;
- receiving, via the nudging plugin application, respective pre-transaction user behavior data related to one or more checkout items from the shopping platform user interface associated with a user checkout action;
- generating a second nudging user interface with one or more personalized digital nudges that provide real-time optimized savings recommendations based on the user data and the pre-transaction user behavior data associated with the user checkout action; and
- outputting the second nudging user interface to the user device to be displayed with a checkout portion of the shopping platform user interface using the nudging plugin application.

12. The computing system of claim 11, wherein the processing further comprises:
- analyzing the transaction data and the historical user behavior data to generate the user habitual spending features during a past period of time;
- generating a spending trend of an item of the transaction data during a past period of time, the spending trend of the item comprising a spending frequency of the item similar to the one or more checkout items; and
- updating the user profile to include the habitual spending features and the spending trend of the item of the transaction data during the past period of time.

20

13. The computing system of claim 12, wherein the processing further comprises:
- receiving respective pre-transaction user behavior data associated with the ongoing user navigation action and the user checkout action through the user device, the user device executing the nudging plugin application to interact with the shopping platform user interface over a network, the respective pre-transaction user behavior data comprising navigation times, data of one or more checkout items, user shopping mood state, and shopping session duration; and
- processing the user habitual spending features, the spending trend of the item of the transaction data, and the pre-transaction user behavior data to determine the real-time optimized savings recommendations.

14. The computing system of claim 11, wherein the one or more personalized digital nudges of the second nudging user interface comprises one or more selectable user interface elements enabled to change user behaviors to implement respective real-time optimized savings recommendations associated with respective user accounts.

15. The computing system of claim 14, wherein generating the second nudging user interface comprises:
- determining a first real-time optimized saving suggestion as a first selectable user interface element to achieve an instant savings goal in real-time; and
- in response to a user selection of the first selectable user interface element, simultaneously removing the one or more checkout items and transferring a checkout amount from the user's checking account to the user's saving account.

16. The computing system of claim 14, wherein generating the second nudging user interface comprises:
- determining a first real-time optimized saving suggestion as a first selectable user interface element to make a payment to one of the user accounts based on balance due dates and interest charges of the user accounts; and
- in response to a user selection of the first selectable user interface element, simultaneously removing the one or more checkout items and making the payment of a checkout amount from the user's checking account to one of the user accounts.

17. The computing system of claim 14, wherein generating the second nudging user interface comprises:
- determining a first real-time optimized saving suggestion with an optimized payment method as a first selectable user interface element based on balance due dates and interest charges of the user accounts; and
- in response to a user selection of the first selectable user interface element, switching to the optimized payment method associated with one of the user accounts with a lower interest charge to purchase the one or more checkout items.

18. The computing system of claim 11, wherein the processing further comprises:
- analyzing the pre-transaction user behavior data associated with the one or more checkout items to generate a pause nudging user interface with one or more digital pause nudges to lock the user checkout action for a given period of time, the pause nudging user interface being overlapped with the shopping platform user interface, the one or more digital pause nudges comprising contextual data related to the one or more checkout items to influence the user to determine whether to check out the one or more checkout items; and unlocking the user checkout action after the given period of time or exiting the pause nudging user interface based on a user interaction with the pause nudging user interface.

19. The computing system of claim 11, wherein the first nudging user interface is overlapped with the shopping platform user interface, and the second nudging user interface is overlapped with the shopping platform user interface.

20. The computing system of claim 11, wherein the first nudging user interface includes one or more user interface elements of:
- a spending summary on the shopping platform during a past period of time,
- a suggested budget for a future period of time,
- suggested actions about one or more items related to the ongoing user navigation action,
- a previous user mood state associated with the historical user behavior data,
- a set of selectable user interface elements for the user to choose a real-time user mood state, and
- one or more nudging questions to influence the user to make mindful behavioral changes to optimize spending.

* * * * *